United States Patent
Gallar et al.

(10) Patent No.: US 9,874,456 B2
(45) Date of Patent: Jan. 23, 2018

(54) METHOD, APPARATUS AND COMPUTER PROGRAM PRODUCT FOR PROVIDING A DESTINATION PREVIEW

(71) Applicant: HERE GLOBAL B.V., Eindhoven (NL)

(72) Inventors: Enrique Jose Gallar, Berlin (DE); Stephan Scheunig, Berlin (DE); Mark Pearce, Berlin (DE)

(73) Assignee: HERE Global B.V., Eindhoven (NL)

( * ) Notice: Subject to any disclaimer, the term of this patent is extended or adjusted under 35 U.S.C. 154(b) by 104 days.

(21) Appl. No.: 14/556,000

(22) Filed: Nov. 28, 2014

(65) Prior Publication Data
US 2016/0153789 A1    Jun. 2, 2016

(51) Int. Cl.
*G01C 21/36*    (2006.01)

(52) U.S. Cl.
CPC ................ *G01C 21/3635* (2013.01)

(58) Field of Classification Search
CPC ........... G01C 21/3626; G01C 21/3635; G01C 21/3638; G06F 3/0481; G06F 3/04815; G06F 3/0484; G06F 3/04847; G06F 4/04845; G06T 19/003
See application file for complete search history.

(56) References Cited

U.S. PATENT DOCUMENTS

| | | | | |
|---|---|---|---|---|
| 5,884,218 A * | 3/1999 | Nimura | ................ | G08G 1/0969 340/995.1 |
| 6,434,482 B1 * | 8/2002 | Oshida | ............... | G01C 21/3679 340/995.24 |
| 7,869,943 B1 * | 1/2011 | Simon | ................. | G01C 23/005 244/75.1 |
| 8,649,973 B2 * | 2/2014 | Kawaguchi | ........ | G01C 21/3626 345/205 |
| 2005/0021227 A1 * | 1/2005 | Matsumoto | ........ | G01C 21/3415 701/431 |
| 2008/0288166 A1 * | 11/2008 | Onishi | ................... | G01C 21/20 701/533 |

(Continued)

OTHER PUBLICATIONS

Bimmerfest (http://www.bimmerfest.com/forums/showthread.php?t=765570) BMW Blog relating to Coding and Programming, specifically Map Auto Zoom Blog entry created Apr. 15, 2014, various authors with each entry individually timestamped.*

(Continued)

*Primary Examiner* — John R Olszewski
*Assistant Examiner* — Tommy Worden
(74) *Attorney, Agent, or Firm* — Alston & Bird LLP

(57) ABSTRACT

A method, apparatus and computer program product are provided for providing a destination preview while using a navigation device. As a user approaches a destination, a mode of navigation assistance may change from route guidance to destination preview. The destination preview may include an overhead perspective of an area surrounding a destination. The destination preview may be animated so as to allow the user to maintain perspective of the current location, planned route, and other objects while previewing the destination. The animated perspective path, including height, zoom level, angle, and speed of a vantage point, may be calculated so as to provide improved visibility for a user.

13 Claims, 8 Drawing Sheets

(56) References Cited

U.S. PATENT DOCUMENTS

| | | | |
|---|---|---|---|
| 2008/0312821 A1* | 12/2008 | Muhlfelder | G01C 21/3676 701/533 |
| 2009/0046111 A1* | 2/2009 | Joachim | G01C 21/367 345/660 |
| 2009/0281723 A1* | 11/2009 | Kurata | G01C 21/3682 701/408 |
| 2010/0250113 A1* | 9/2010 | Miyata | G01C 21/3635 701/533 |
| 2011/0106432 A1* | 5/2011 | Kawaguchi | G01C 21/3626 701/533 |
| 2013/0317738 A1 | 11/2013 | Ren et al. | |
| 2013/0321402 A1* | 12/2013 | Moore | G01C 21/3611 345/419 |
| 2013/0325319 A1* | 12/2013 | Moore | G01C 21/36 701/412 |
| 2013/0325340 A1* | 12/2013 | Forstall | G01C 21/00 701/533 |
| 2013/0325341 A1* | 12/2013 | van Os | G01C 21/3611 701/533 |
| 2013/0326384 A1* | 12/2013 | Moore | G01C 21/3638 715/771 |
| 2013/0326425 A1* | 12/2013 | Forstall | G01C 21/3638 715/851 |
| 2013/0332890 A1 | 12/2013 | Raniic et al. | |
| 2013/0345962 A1 | 12/2013 | van Os et al. | |
| 2014/0071119 A1 | 3/2014 | Piemonte et al. | |
| 2014/0074391 A1* | 3/2014 | Tate, Jr. | B60L 11/1862 701/400 |
| 2014/0293755 A1* | 10/2014 | Geiser | G04B 19/24 368/12 |
| 2014/0330517 A1* | 11/2014 | Barnes | G06Q 10/06 701/541 |
| 2014/0365113 A1* | 12/2014 | McGavran | G01C 21/00 701/425 |
| 2015/0127191 A1* | 5/2015 | Misra | G08G 1/0112 701/1 |
| 2016/0061613 A1* | 3/2016 | Jung | G01C 21/3632 701/49 |
| 2016/0153789 A1* | 6/2016 | Gallar | G01C 21/34 701/408 |

OTHER PUBLICATIONS

Nunal, Paul, *Best Android apps for drivers, car owners, and car enthusiasts* [online] [retrieved Feb. 19, 2015]. Retrieved from the Internet: <URL: http://www.androidauthority.com/best-android-apps-car-enthusiasts-car-owners-drivers-87392/>. (dated May 21, 2012) 1-13.

Nurminen, A. et al., *Designing Interactions for Navigation in 3D Mobile Maps*, Springer Science and Business Media (2008) 31pages.

Alpine, Navigation Software for INA-W910R, INA-W910R Owner's Manual, Version 1.0 (Feb. 2011) 1-80.

* cited by examiner

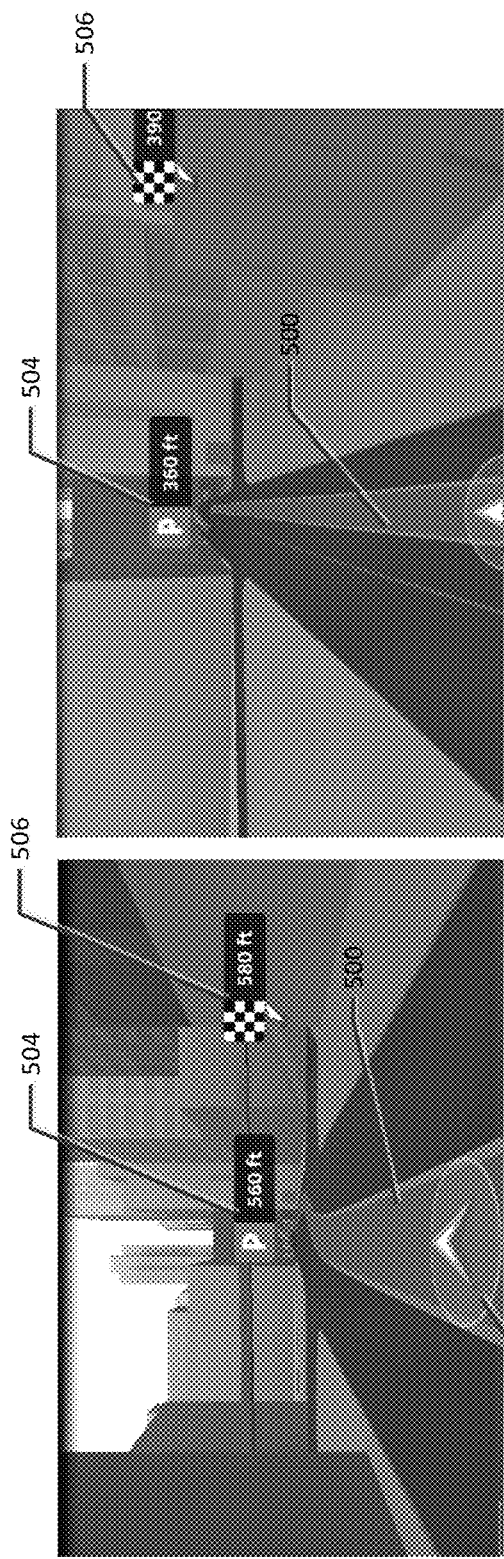
Figure 5A
Figure 5B
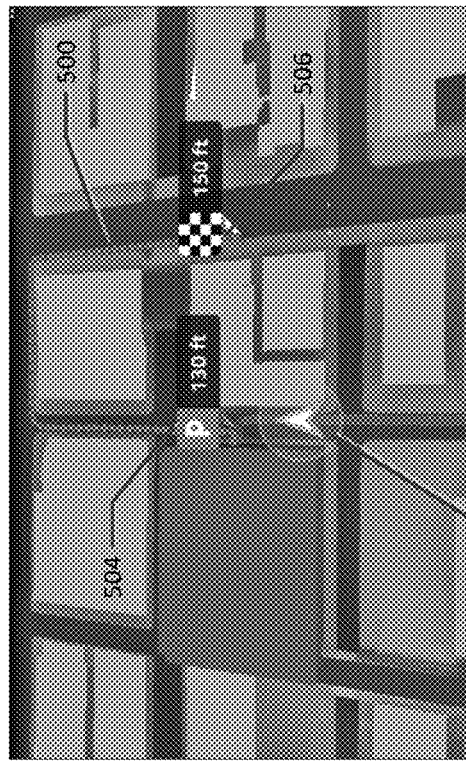
Figure 5D
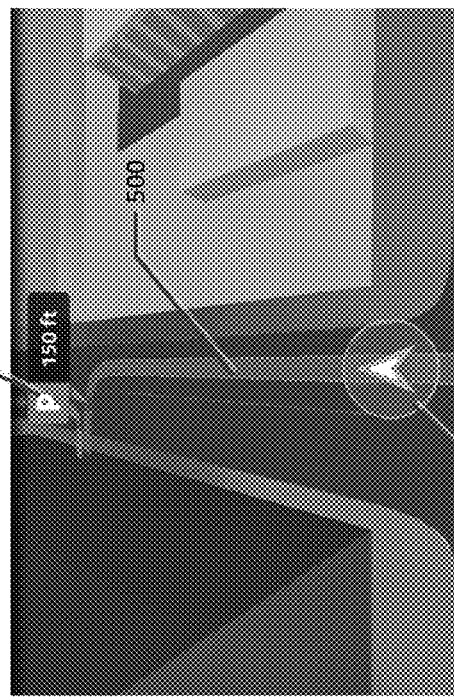
Figure 5C

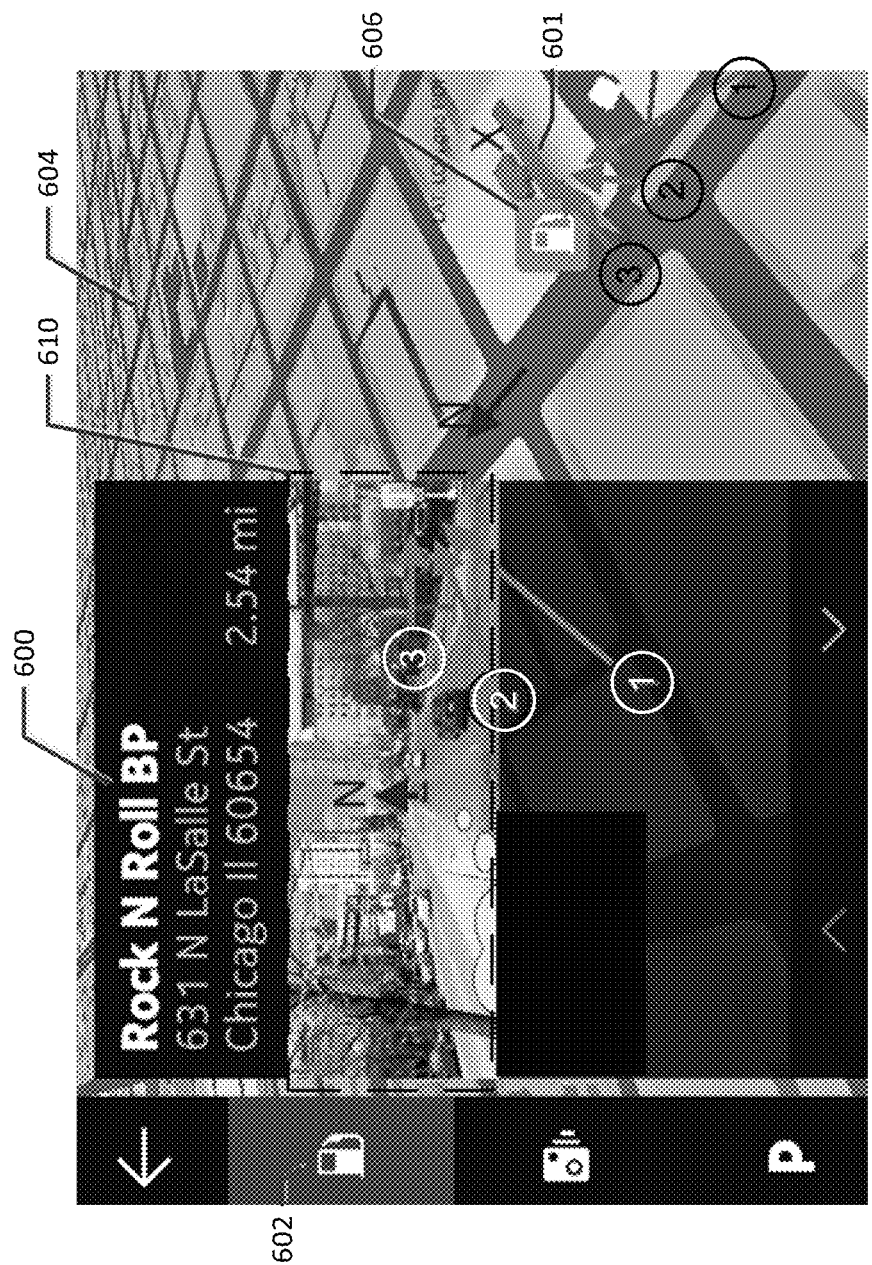

METHOD, APPARATUS AND COMPUTER PROGRAM PRODUCT FOR PROVIDING A DESTINATION PREVIEW

TECHNOLOGICAL FIELD

An example embodiment of the present invention relates generally to providing navigation assistance, and more particularly, to a method, apparatus and computer program product for providing a destination preview.

BACKGROUND

Navigation assistance is available in vehicles and on mobile devices for users to receive directions and route guidance. Many navigation assistance systems reflect real time positioning and movement as provided by a GPS (Global Positioning System) implemented in vehicles and/or mobile devices.

Navigation assistance may assist a user by determining a current location, receiving a user input indicating a target destination, and calculating a route or routes to the target destination. The navigation assistance system may update in real time as the changes to the location are detected by the GPS, to provide a current location with respect to a displayed map and route. Estimated arrival times, travel times, and distances may therefore be provided to the user. Detailed directional maps as well as directions by audio may be provided.

In additional to planning a route to a destination, and providing the route guidance, navigation assistance systems provide many additional features, such as providing indications of a point of interest (POI) along a planned route, planning a route based on various modes of transportation (e.g., walking, driving, riding buses, etc.), and/or the like.

Furthermore, advances in related technologies such as satellite imagery have led to an increasing amount of imagery data, and have further enabled navigation assistance to incorporate the imagery such that users can view the satellite imagery while navigating. In some examples a route may be illustrated on different types of base maps, which may highlight certain aspects in comparison to other types of base maps. For example, a user may switch from viewing a street map to satellite imagery. Additionally, the availability of street level imagery may enhance navigation assistance, as a user may view an image of an actual location which the user attempts to locate.

However, the abundance of directional assistance, imagery, and local area information may be overwhelming to users because it is not presented in a way that can be efficiently comprehended while trying to navigate to a destination.

BRIEF SUMMARY

A method, apparatus, and computer program product are therefore provided for providing a destination preview. The method includes receiving an indication that a current remaining travel time to the destination is less than a pre-defined threshold amount of time. The method further includes, in response to receiving the indication that the current remaining travel time is less than the pre-defined threshold amount of time, causing a mode of navigation assistance to change from a route guidance mode to a destination preview mode. The destination preview mode is based on an overhead perspective.

In some examples, causing the mode of navigation assistance to change occurs further in response to identifying an opportune time based on a detected movement. In some embodiments, causing the mode of navigation assistance to change comprises changing a type of base layer map and/or zooming out.

In some embodiments, the destination preview mode provides an animation beginning from a current location to provide a view of the destination from the overhead perspective. In some examples, the method further includes determining a line of action based on the current location, a planned route, and the destination. The method may include calculating an animation perspective path from the current location and continuing toward the destination while a vantage point remains on one side of the line of action.

Calculating the animation perspective path may comprise determining a height, zoom level, angle, and speed of the vantage point along the animation perspective path. The destination may be a transition point from one mode of transportation to another, and the destination preview provides display of an end of a route associated with a first mode of transportation, and a beginning of another route associated with a second mode of transportation. In some embodiments, the destination is a POI along a planned route.

An apparatus is also provided. The apparatus comprises at least one processor and at least one memory including computer program code, the at least one memory and the computer program code configured to, with the processor, cause the apparatus to at least determine to receive an indication that a current remaining travel time to the destination is less than a pre-defined threshold amount of time. In response to receiving the indication that the current remaining travel time is less than the pre-defined threshold amount of time, the apparatus causes a mode of navigation assistance to change from a route guidance mode to a destination preview mode, wherein the destination preview mode is based on an overhead perspective.

In some examples, causing the mode of navigation assistance to change occurs further in response to identifying an opportune time based on a detected movement. Causing the mode of navigation assistance to change includes changing a type of base layer map, and/or zooming out. In some examples, the destination preview mode provides an animation beginning from a current location to provide a view of the destination from the overhead perspective.

The at least one memory and the computer program code are further configured to, with the processor, cause the apparatus to determine a line of action based on the current location, a planned route, and the destination, and calculating an animation perspective path from the current location and continuing toward the destination while a vantage point remains on one side of the line of action.

In some examples, calculating the animation perspective path comprises determining a height, zoom level, angle, and speed of the vantage point along the animation perspective path.

The destination is a transition point from one mode of transportation to another, and the destination preview provides display of an end of a route associated with a first mode of transportation, and a beginning of another route associated with a second mode of transportation. In some embodiments, the destination is a POI along a planned route.

A computer program product is also provided. The computer program product includes at least one non-transitory computer-readable storage medium having computer-executable program code instructions stored therein, the computer-executable program code instructions comprising program code instructions for receiving an indication that a current remaining travel time to the destination is less than a pre-defined threshold amount of time. The computer-executable program code instructions further comprise program code for, in response to receiving the indication that the current remaining travel time is less than the pre-defined threshold amount of time, causing a mode of navigation assistance to change from a route guidance mode to a destination preview mode. The destination preview mode is based on an overhead perspective.

In some embodiments, causing the mode of navigation assistance to change occurs further in response to identifying an opportune time based on a detected movement. Causing the mode of navigation assistance to change comprises a type of base layer map, and/or zooming out.

In some examples, the destination preview mode provides an animation beginning from a current location to provide a view of the destination from the overhead perspective. The computer-executable program code instructions further comprise program code instructions for determining a line of action based on the current location, a planned route, and the destination, and calculating an animation perspective path from the current location and continuing toward the destination while a vantage point remains on one side of the line of action.

In some examples, calculating the animation perspective path comprises determining a height, zoom level, angle, and speed of the vantage point along the animation perspective path. The destination may be a transition point from one mode of transportation to another, and the destination preview provides display of an end of a route associated with a first mode of transportation, and a beginning of another route associated with a second mode of transportation. In some examples, the destination is a POI along a planned route.

An apparatus is also provided with means for receiving an indication that a current remaining travel time to the destination is less than a pre-defined threshold amount of time. The apparatus also includes means for, in response to receiving the indication the current remaining travel time is less than the pre-defined threshold amount of time, causing a mode of navigation assistance to change from a route guidance mode to a destination preview mode. The destination preview mode is based on an overhead perspective.

BRIEF DESCRIPTION OF THE DRAWINGS

Figure 1:
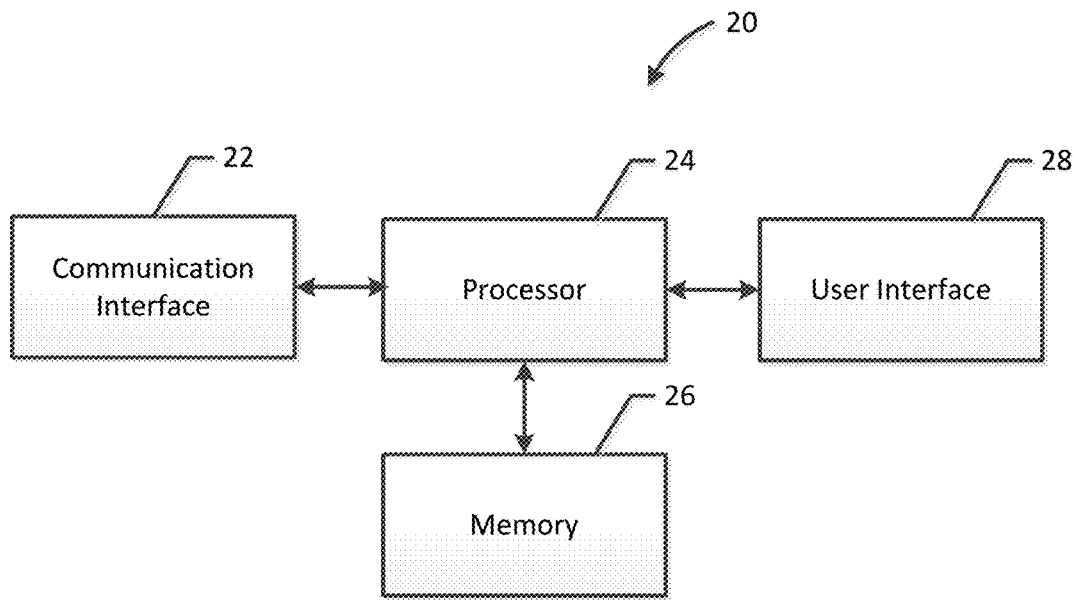
Figure 2:
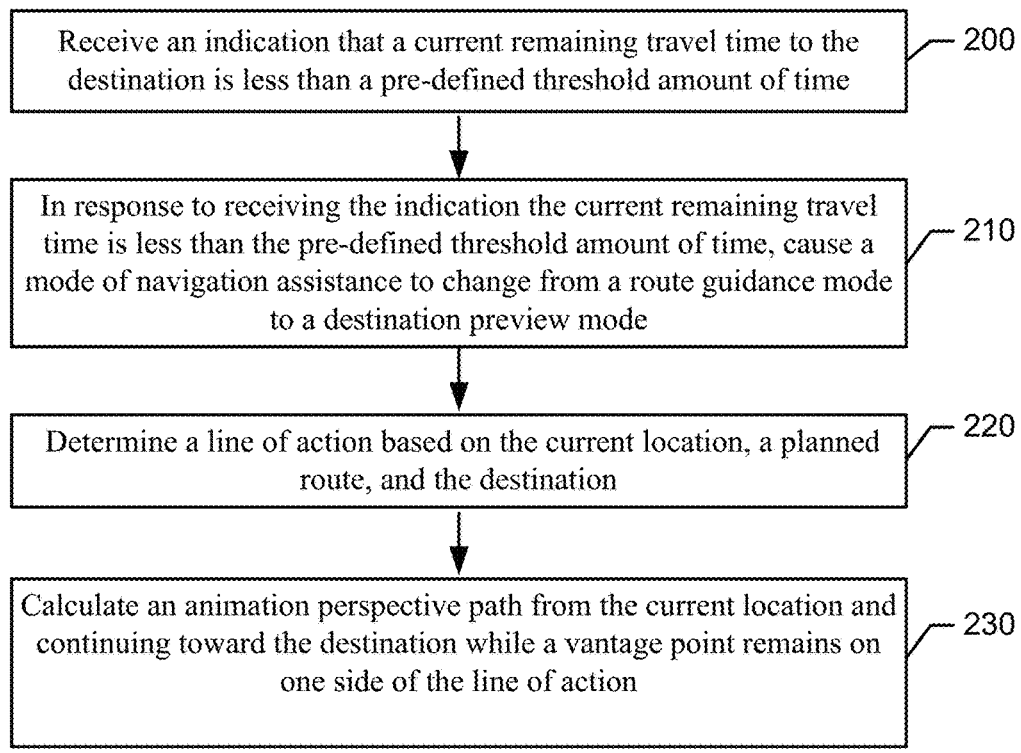
Figure 4A:
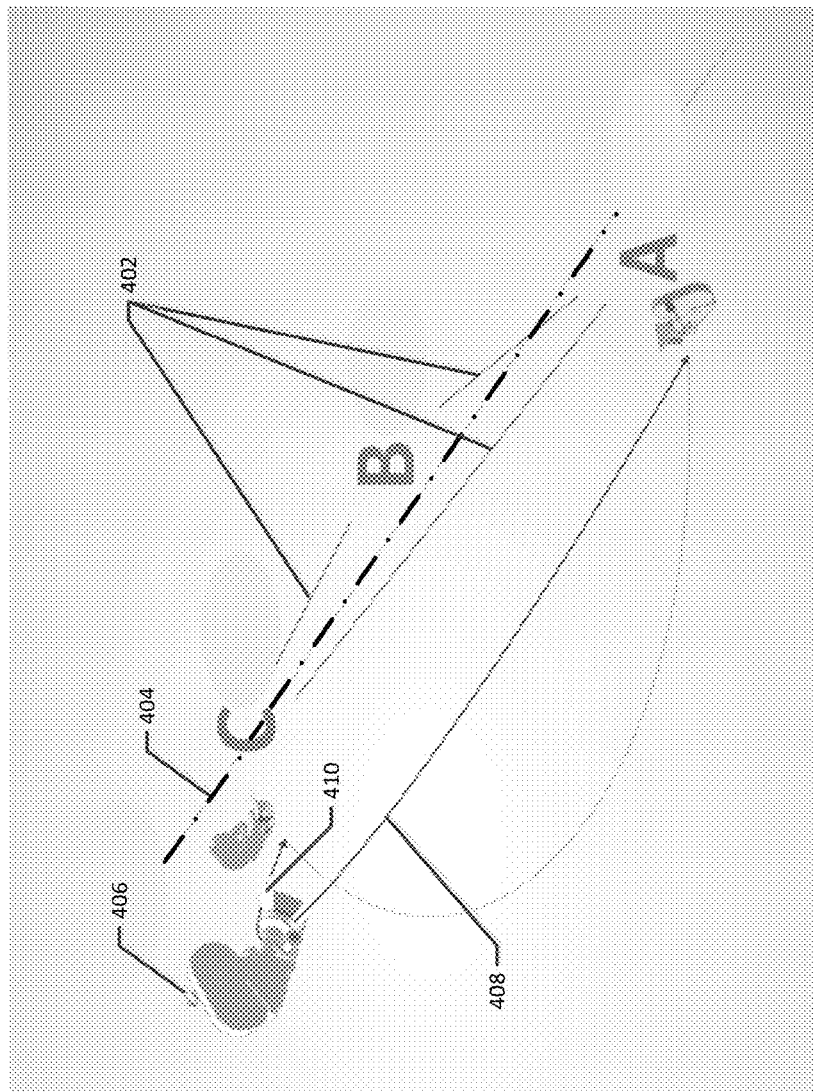

Having thus described certain example embodiments of the present invention in general terms, reference will hereinafter be made to the accompanying drawings which are not necessarily drawn to scale, and wherein:

FIG. 1 is a block diagram of an apparatus according to an example embodiment of the present invention;

FIG. 2 is a flowchart of operations for providing a destination preview, according to an example embodiment;

FIGS. 3A-3E are example displays, according to an example embodiment;

FIG. 4A is a schematic diagram for determining an animation path, according to an example embodiment;

FIGS. 4B-4L are example displays, according to an example embodiment;

FIGS. 5A-5D are example displays, according to an example embodiment; and

FIG. 6 is an example display, according to an example embodiment.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a physical storage medium (e.g., volatile or non-volatile memory device), may be differentiated from a "computer-readable transmission medium," which refers to an electromagnetic signal.

A method, apparatus and computer program product are provided in accordance with an example embodiment of the present invention for providing a destination preview. In this regard, a user interface of a device, such a mobile device or a device affixed to a vehicle, such as to a dashboard or the like, may provide navigation assistance to a user. A display reflecting a planned route to a destination, a current location along the route, and/or other data relating to the navigation, such as estimated time until arrival, may be provided to the user so as to assist the user in turn-by-turn navigation. Such functionality may be referred to herein as a route guidance mode, as the device assists the user by providing navigation assistance from a perspective of a real-time detected location with respect to a planned route. As such, precise directions regarding upcoming turns and navigation can be provided with regard to the user's position along the route.

As described herein, embodiments of the claims provide for a destination preview during navigation assistance. After a user arrives within a threshold range (e.g., by estimated time of arrival and/or distance) of a destination, embodiments may change the mode of navigation assistance from the route guidance mode described above, to a destination preview mode so that the user may become familiarized with the general area of the destination. In this regard, the device display may change from displaying a user interface designed for route guidance to a destination preview. The transition provided by the display may include zooming out from the current location to provide an overhead perspective, panning to the destination, and zooming in on a map of an area immediately surrounding the destination.

In this regard, the destination may be an ultimate destination of a planned route, or in some examples, may be considered a landmark or POI along a planned route. In some examples, the destination may be a first or intermediary destination or stopping point on the way to another destination, such as a gas station or parking lot. Example embodiments provided herein may additionally include animation, and/or incorporate real-world imagery, POI identification, and/or the like. Some example embodiments may further ensure that the destination preview is provided to the user at a safe point in the journey, such as when the device is stationary. The destination preview may include an audible alert so as to alert the user when the destination preview is provided. Providing the destination preview while the user is stopped at a red light, for example, may enable the user to view the destination preview without endangering the user while driving.

FIG. 1 is a schematic diagram of an example apparatus configured for performing any of the operations described herein. Apparatus 20 is an example embodiment that may be embodied by or associated with any of a variety of computing devices that include or are otherwise associated with a device configured for providing a destination preview. For example, the computing device may be a mobile terminal, such as a personal digital assistant (PDA), mobile telephone, smart phone, personal navigation device, smart watch, tablet computer, camera or any combination of the aforementioned and other types of voice and text communications systems. Alternatively, the computing device may be a fixed computing device, such as a built-in vehicular navigation device or the like.

Still further, the apparatus may be embodied by or associated with a plurality of computing devices that are in communication with or otherwise networked with one another such that the various functions performed by the apparatus may be divided between the plurality of computing devices that operate in collaboration with one another.

The apparatus 20 may be equipped with any number of sensors (not shown), such as a global positioning system (GPS), accelerometer, and/or gyroscope. Any of the sensors may be used to sense information regarding the movement, positioning, or orientation of the device for use in navigation assistance, as described herein according to example embodiments. In some example embodiments, such sensors may be implemented in a vehicle or other remote apparatus, and the information detected may be transmitted to the apparatus 20, such as by near field communication (NFC) including, but not limited to, Bluetooth™ communication, or the like.

The apparatus 20 may include, be associated with, or may otherwise be in communication with a communication interface 22, processor 24, a memory device 26 and a user interface 28. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As noted above, the apparatus 20 may be embodied by a mobile device. However, in some embodiments, the apparatus may be embodied as a chip or chip set. In other words, the apparatus may comprise one or more physical packages (for example, chips) including materials, components and/or wires on a structural assembly (for example, a circuit board). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 24 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 24 may be configured to execute instructions stored in the memory device 26 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (for example, the computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 20 of an example embodiment may also include or otherwise be in communication with a user interface 28. The user interface may include a touch screen display, a speaker, physical buttons, and/or other input/output mechanisms. In an example embodiment, the processor 24 may comprise user interface circuitry configured to control at least some functions of one or more input/output mechanisms. The processor and/or user interface circuitry comprising the processor may be configured to control one or more functions of one or more input/output mechanisms through computer program instructions (for example, software and/or firmware) stored on a memory accessible to the processor (for example, memory device 24, and/or the like). In this regard, the apparatus 20 may interpret positioning data collected by its sensors and provide a destination preview including visual and audio feedback, to a user, for example.

The apparatus 20 of an example embodiment may also optionally include a communication interface 22 that may be any means such as a device or circuitry embodied in either hardware or a combination of hardware and software that is configured to receive and/or transmit data from/to other electronic devices in communication with the apparatus, such as by NFC, described above. Additionally or alternatively, the communication interface 22 may be configured to communicate over Global System for Mobile Communications (GSM), such as but not limited to Long Term Evolution (LTE). In this regard, the communication interface 22 may include, for example, an antenna (or multiple antennas) and supporting hardware and/or software for enabling communications with a wireless communication network. Additionally or alternatively, the communication interface 22 may include the circuitry for interacting with the antenna(s) to cause transmission of signals via the antenna(s) or to handle receipt of signals received via the antenna(s). In some environments, the communication interface 22 may alternatively or also support wired communication may alternatively support vehicle to vehicle or vehicle to infrastructure wireless links.

The apparatus 20 may support a mapping application so as to present maps or otherwise provide navigation assistance. In order to support a mapping application, the computing device may include or otherwise be in communication with a geographic database, such as may be stored in memory 26. For example, the geographic database includes node data records, road segment or link data records, point of interest (POI) data records, and other data records. More, fewer or different data records can be provided. In one embodiment, the other data records include cartographic data records, routing data, and maneuver data. One or more portions, components, areas, layers, features, text, and/or symbols of the POI or event data can be stored in linked to, and/or associated with one or more of these data records. For example, one or more portions of the POI, event data, or recorded route information can be matched with respective map or geographic records via position or GPS data associations (such as using known or future map matching or geo-coding techniques), for example. Furthermore, other positioning technology may be used, such as electronic horizon sensors, radar, lidar, ultrasonic and/or infrared sensors.

In example embodiments, the road segment data records are links or segments representing roads, streets, or paths, as can be used in the calculated or planned route, according to example embodiments. The node data records are end points corresponding to the respective links or segments of the road segment data records. The road link data records and the node data records represent a road network, such as used by vehicles, cars, and/or other entities. Alternatively, the geographic database can contain path segment and node data records or other data that represent pedestrian paths or areas in addition to or instead of the vehicle road record data, for example. The node data records may be accessed by the apparatus 20 while providing navigational assistance and destination previews according to example embodiments provided herein.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database can include data about the POIs and their respective locations in the POI data records. The geographic database can also include data about places, such as cities, towns, or other communities, and other geographic features, such as bodies of water, mountain ranges, etc. Such place or feature data can be part of the POI data or can be associated with POIs or POI data records (such as a data point used for displaying or representing a position of a city). In addition, the geographic database can include event data (e.g., traffic incidents, weather reports, construction, scheduled events, unscheduled events, etc.) associated with the POI data records or other records of the geographic database. In some embodiments, as described herein, POI data may be incorporated into a destination preview by apparatus 20 so that a user may locate a particular type of POI, such as a gas station or parking, for example.

The geographic database can be maintained by the content provider (e.g., a map developer) in association with the services platform. By way of example, the map developer can collect geographic data to generate and enhance the geographic database. There can be different ways used by the map developer to collect data. These ways can include obtaining data from other sources, such as municipalities or respective geographic authorities. In addition, the map developer can employ field personnel to travel by vehicle along roads throughout the geographic region to observe features, record information about them, and/or capture real-world imagery, for example. Also, remote sensing, such as aerial or satellite photography, can be used.

For example, geographic data is compiled to organize and/or configure the data for performing navigation-related functions and/or services, such as those performed by processor 24, for example, including but not limited to route calculation, route guidance, map display, speed calculation, distance and travel time functions, and other functions. The navigation-related functions can correspond to vehicle navigation, pedestrian navigation or other types of navigation, and can be utilized by the apparatus 20 to provide destination previews as described herein. In this regard, the destination preview may be considered a supplementary feature to route guidance. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The geographic database may be a server side geographic database accessible to apparatus 20 over communication interface 22, but in alternate embodiments, a client side geographic database, such as one stored on memory 26 can represent a compiled navigation database that can be used in or with the computing device to provide navigation and/or map-related functions. For example, the geographic database can be used with the end user device, such as apparatus 20, to provide an end user with navigation features, such via user interface 28. In such a case, the geographic database can be downloaded or stored on the computing device, such as in applications, or the computing device can access the geographic database through a wireless connection (such as via a server and/or a communication network), for example. Regardless of implementation, the geographic database may be utilized by the apparatus 20 to provide destination previews as described herein according to example embodiments.

Having now described apparatus 20 according to an example embodiment, FIG. 2 is a flowchart of operations performed by apparatus 20 for providing a destination preview.

As shown by operation 200, the apparatus 20 may include means, such as communication interface 22, processor 24, memory 26, user interface 28 and/or the like, for receiving an indication (such as from a vehicle sensor) or determining that a current remaining travel time to a destination is less than a pre-defined threshold amount of time. For example, while the apparatus 20 operates in a route guidance mode, meaning the user interface 28 provides feedback to the user regarding navigation along a planned route, the apparatus 20 determines the user is within a threshold range of the destination. For example, memory 26 may store a pre-configured and/or user configured threshold amount of time, such as 5 minutes. According to information detected via sensors of the apparatus 20, or received from another device such as by communication interface 22, the apparatus 20 may determine that the user is less than 5 minutes from the destination.

As an alternative, the apparatus 20 may detect a threshold distance, such as 5 miles. In such an embodiment it may be advantageous to have various threshold distances based on modes of transportation, such as 5 miles for driving, or 300 yards for walking. Distances may be determined based on a direct distance from the current location to a destination, or distance along a planned route from a current location to a destination.

As shown by operation 210, the apparatus 20 may include means, such as communication interface 22, processor 24, memory 26, user interface 28 and/or the like, for causing a mode of navigation assistance to change from a route guidance mode to a destination preview mode. The change in modes may occur in response to receiving the indication that the current remaining travel time is less than the pre-defined threshold amount of time. Additionally or alternatively, the apparatus 20 may detect an opportune time to change modes based on a detected movement of the apparatus 20 and/or the user. For example, a vehicle stopping at a red light, or slowing to a speed below a threshold speed, may indicate that it is an opportune time to switch modes as to not distract the user from the road. In some examples, in addition to detected movement, information collected from the geographic database may be used to determine when to change navigation assistance modes, such as information relating to traffic conditions, congestion, incidents, and/or the like. In some embodiments, any combination of requirements, such as time to destination, distance to destination, speed, and/or the like may be required for the mode of navigation assistance to change. In some examples, the apparatus 20 may require a plurality of conditions to be met to trigger a change to the destination preview mode. For example, when the vehicle is within a threshold distance and is traveling below a threshold speed, the mode may change to destination preview mode. Any of the data processed to determine any number of conditions, may be received from another device such as vehicle sensors, or determined by the apparatus 20 such as by processor 24. A determination to cause a change to the destination preview mode may therefore include a determination based on various pieces of information as described above or the receipt, recognition and subsequent processing of an indication of received information, or any combination thereof.

The destination preview mode is based on an overhead perspective, and in some embodiments, a zoomed-out perspective. In some examples, the destination preview may be an animation generated using a variety of effects and perspectives to provide a view as if the user is flying out from a vehicle for an overhead while maintaining perspective relevant to the current location. The destination preview animation is described in further detail hereinafter. In general, the destination preview mode may be distinguished from the route guidance mode based on the perspective, as the route guidance mode may provide display of route guidance maps and/or imagery from the user perspective navigating along the route with respect to the current location. While in some embodiments a route guidance mode may also be provided from an overhead perspective, the route guidance mode may only include map or imagery data from a limited or immediate area surrounding the current position. For example, the route guidance mode may cause the apparatus 20 to display a zoomed-in portion of a map or imagery such that it does not include the destination, but rather only a subsequent portion of a route, such as determined by a pre-defined distance or time calculation. For example, at a given point in time, the user may only view a map covering the next 30 seconds of the route, according to current detected speeds and/or estimated speeds. A destination preview may therefore provide a "look ahead" for the user to view the destination, and the area or portions covered by the destination preview may not include the current location along a route, but rather the area immediately surrounding the destination, which may include a portion of the planned route such as a last portion prior to arrival at the destination.

FIGS. 3A-3E are example displays provided by apparatus 20 that illustrate a mode of navigation assistance changing from route guidance mode to destination preview mode. Example displays provided herein are provided as examples and may represent snapshots in time of a continuously changing image or video provided on user interface 28. While the apparatus 20 is in a route guidance mode, the continuous image may be updated in real-time to correspond with the user's movement along a route.

Figure 3B:
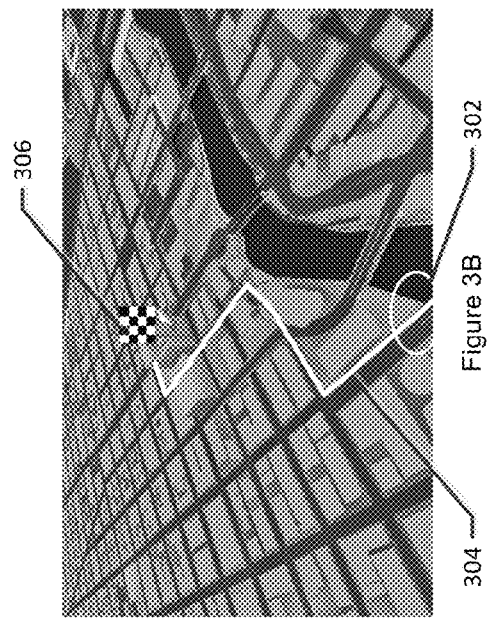
Figure 3D:
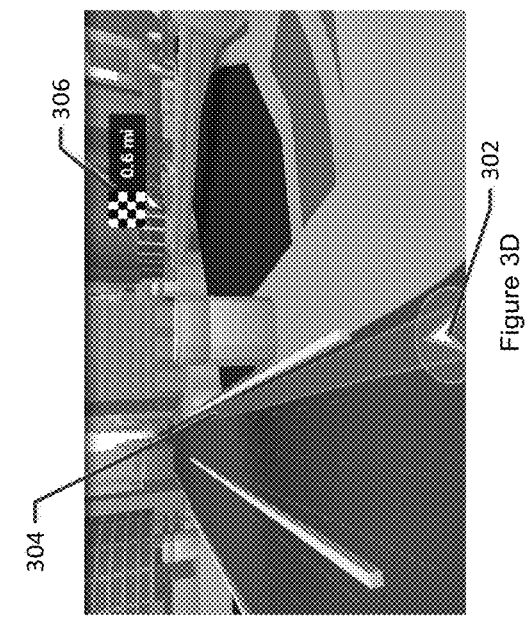
Figure 3A:
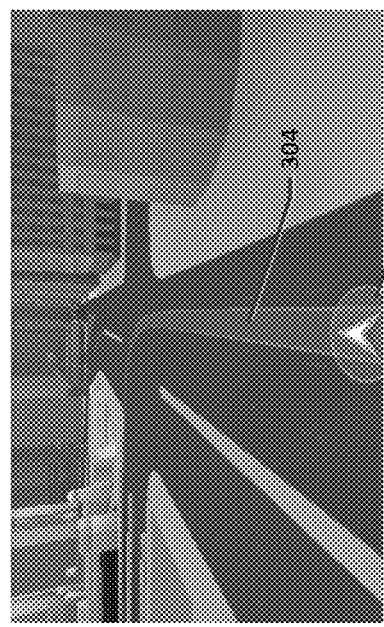

FIG. 3A is a display provided by user interface 28 while the apparatus 20 operates in a route guidance mode. Indicator 302 indicates a current location of a user or apparatus 20. The planned route 304 is illustrated on a map of the immediate area. The perspective is from the user perspective, such as from a vehicle and/or the like moving along the route 304. The display includes three-dimensional effects incorporated with the mapping data so the user can distinguish close landmarks, such as buildings, while interpreting navigational instructions such as a turn ahead in the road and respective position of car position with relation to the destination. The route guidance mode may also include turn-by-turn instructions which may be displayed on the user interface and/or presented audibly to the user.

In response to identifying the user and/or apparatus is within the threshold amount of time from a destination (and/or in response to determining it is an opportune time to change modes), the apparatus changes to a destination preview mode, as provided in FIG. 3B. The destination 306 is visually indicated by a destination flag and a highlighted building, visually distinguished from other nearby buildings. The final portion(s) of the planned route 304 to the destination 306 is also provided.

Additionally or alternatively, an audible indication of the change to the destination preview mode may be provided, such as via user interface 28. For example, the user interface 28 may provide generated speech reciting, "In about 5 minutes you will arrive at your destination. Here is a preview of where you need to go."

Figure 3C:
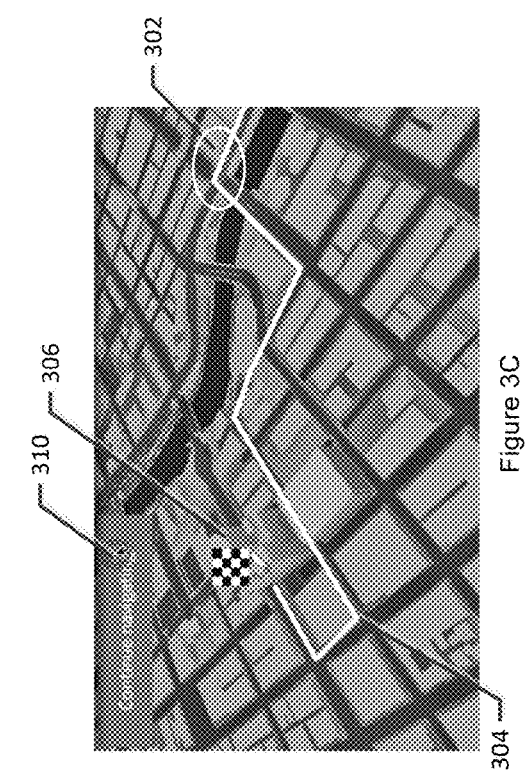

In some examples, the perspective provided in the destination preview mode pans and/or zooms to provide improved visibility to the user. As shown in FIG. 3C, the vantage point (e.g., a hypothetical camera) from which the destination preview is provided, pans left, and zooms in to provide the user with additional detail so that the user may see details of the general area of the destination such as nearby parking. In this example, indicator 302 comes back into view so that the user can see the current location relative to the destination preview. The destination 306 is displayed from a different perspective. Note the planned route 304 comes into better view and is viewable even between two tall buildings, by using different coloring, three-dimensional effects, and changing of the vantage point height and angles (described in further detail hereinafter). The continuous image generated based on the panning and/or zooming of the destination preview, may be considered a destination preview animation. Destination preview animations are described in further detail with respect to FIGS. 4A-4L below.

Returning to FIG. 3C, selection 310 allows a user to select to "continue navigating," by touching a touch screen or selecting the selection 310 to return to the route guidance mode. As an alternative, in some embodiments, the navigation mode may change from destination preview mode to route guidance mode based on another event, such as an elapsed amount of time, completion of display of a destination preview animation, detected movement of the apparatus 20 after having been stationary, exceeding a predetermined threshold speed, and/or the like.

FIG. 3D provides an example display provided by apparatus 20 after returning to the route guidance mode. The perspective is changed back to a user perspective from the current location. Indicator 302 provides the current location along the route 304. In this example, the destination 306 is provided with a remaining distance from the current location.

Figure 3E:
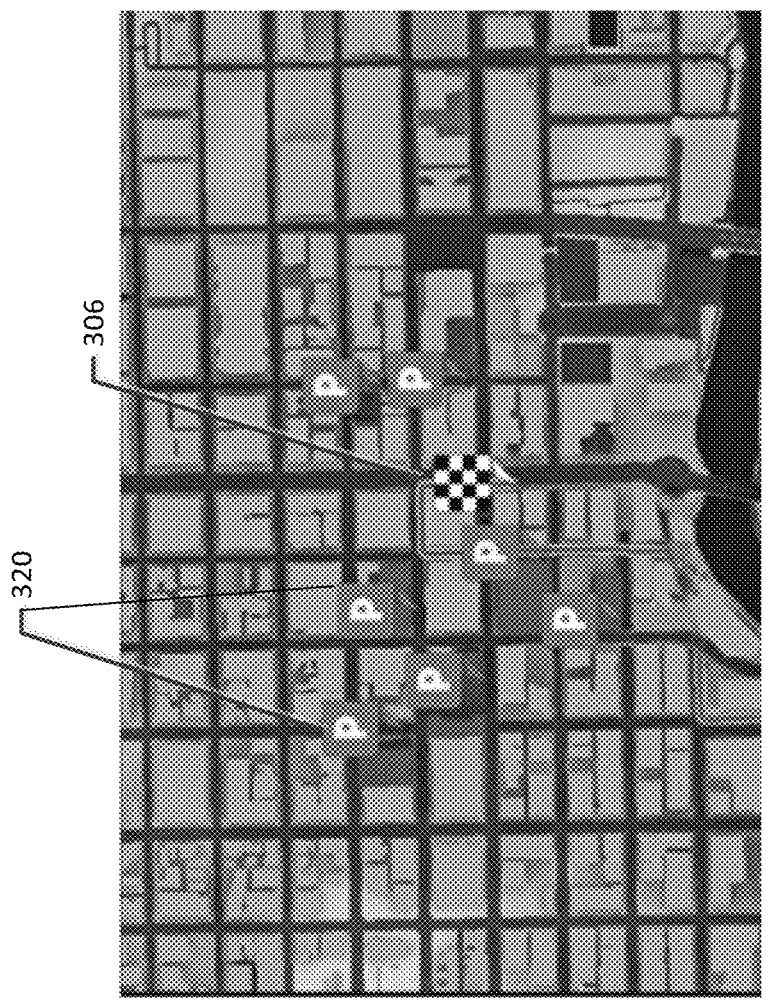

FIG. 3E provides another example display that may be provided as an option during the destination preview mode. In such an example, the user may select a destination, such as relevant service options/POIs, including but not limited to parking places, gas station, and/or the like. For example a user may indicate they wish to find a parking lot near the destination 306. Various indicators 320 indicate options for parking, and a user may select an option. In this regard, the destination may change to the selected location. Additionally or alternatively, embodiments may consider the selected destination an intermediary destination, and provide walking navigation from the selected location to the final destination, such as one previously identified prior to selecting the intermediary destination (e.g., destination 306). Multiple modes of transportation are described in further detail with respect to FIGS. 5A-5D below.

Having described the example displays of FIGS. 3A-3E, which reflect operations 200 and 210 of FIG. 2, the remaining operations of FIG. 2 are example operations of the apparatus 20 for determining a path of the vantage point of the destination preview. As mentioned above, the destination preview may include an animation to provide a view of the destination from an overhead perspective. In this regard, an animation may be considered as generated by a "flyover" of a hypothetical camera starting from a current location of a user, zooming out to a high level perspective, and panning to the destination, so as to provide improved or optimal site and perspective for the user and always keeping the current location marker and/or the destination in view, so situational awareness is provided.

As shown by operation 220, apparatus 20 may include means, such as processor 24, memory 26 and/or the like, for determining a line of action based on the current location, a planned route, and the destination. The line of action may serve as a basis for determining a path of the animation, according to example embodiments. See FIG. 4A. Point A represents a current location of a user based on a detected location of apparatus 20, and/or received by apparatus 20 such as when detected by a sensor in a vehicle, for example. Point B represents a planned route which may be defined as a combination of waypoints and splines connecting the waypoints. Point B may be determined based on a halfway or midway calculation along the route and in between the current location and destination, for example. In some example embodiments, point B may be an average or midpoint of waypoints making up the planned route, and may not necessarily lie directly on the planned route. Regardless of implementation, point B is in a location at least generally representative of the planned route.

Point C represents a destination of the planned route. Connectors 402 connecting the current location (point A), a point representative of the planned route (point B), such as intermediate point on the planned route, and the destination (point C) form a general shape that defines a line of action 404. In this regard the line of action 404 may generally represent the middle of points A, B, and C. In some example embodiments the line of action 404 may be determined based on an orthocenter of a triangle formed by connectors 402. As another example, the line of action 404 minimizes the aggregate distance from each point, and may be considered a best fit line. As yet another example, a line directly from the current location (point A) to the destination (point C) may be considered the line of action 404.

Returning to FIG. 2, as shown by operation 230, apparatus 20 may include means, such as processor 24, memory 26 and/or the like, for calculating an animation perspective path from the current location and continuing toward the destination while a vantage point remains on one side of the line of action. In some examples, the animation perspective path may be calculated in real time as the animation is provided to the user. In FIG. 4, vantage point 406 represents a position from which the animation is generated. In this regard, vantage point 406 may be considered a hypothetical camera aimed downward and flying over the general area along an animation perspective path 408 as described below.

The animation perspective path 408 may be determined based on a variety of factors. First, the animation perspective path 408 may be prevented from crossing the line of action 404 so as to provide an optimal perspective for the user. The user may therefore maintain perspective of the current location, the planned route or general location of the planned route, and the destination. The user may also have a clear understanding of spatial relationships amongst the current location, the planned route, destination, and/or other objects displayed on the user interface. In general, the vantage point may begin at the current location, and move toward the destination such that the destination eventually comes into view. The height and angle of the vantage point may vary throughout the animation such that as the destination comes into view, the current location and/or route remain in view so as to enable the user to maintain perspective.

The animation perspective path 408 may be further based on factors affecting the user's vision. Since three dimensional effects may be advantageously incorporated into the destination preview animation, tall buildings or other structures may be considered in determining the animation perspective path. For example, the vantage point may pause after passing a tall building, and turn slightly to allow the user to see between buildings. In some examples, the height of the vantage point, or zoom level may change to improve visibility with respect to tall buildings. In some examples, the perspective path and/or animation may trigger changes to map features. For example, three dimensional effects may be temporarily removed such that building footprints remain, reducing occlusions and enhancing visibility to the destination. In such examples, the visibility is improved by changing an underlying map or base layer map, and not necessarily the animation perspective path or height of the vantage point.

In some examples, the apparatus 20, such as processor 24, may determine the animation perspective path based on a set of rules and such that an optimal or improved visibility is provided to the user. A rule of maximum may be enforced to ensure that the animation perspective path 408 is determined such that the most information, a majority of information, or a selected subset of important information is presented to the user. For example, the geographic database may provide details regarding the general area. The apparatus 20 may therefore identify key POIs, or areas of high concentration of POIs for example, in determining the animation motion curve, camera perspective parameters and travel path.

In some embodiments, the apparatus 20 may determine the animation perspective path 408 by applying curvature to the line of action 410 The arc may be defined as a 180 degree angle with radius A-C and pivoting around C point. A large portion of the animation perspective path 408 in FIG. 4 reflects subtle curvature, while the curve 410 near the destination reflects a sharp curve once the vantage point 406 approaches and passes the destination, providing different angles and perspective to the user of the destination as the vantage point 406 orbits or partially orbits the destination. In this regard, the animation perspective path may be parabolic or hook shaped. Such curvature may provide optimal views between tall buildings, or the most visibility of the immediate area surrounding the destination. In this regard, embodiments may provide understanding of road network structure in the vicinity of the destination.

Even further, while determining the animation perspective path 408, apparatus 20 may apply different speeds, height, angle, and/or zoom-level of the vantage point 406.

For example, the first view of the destination may coincide with a pausing or hovering. A beginning portion of the animation may be provided such that the vantage point 406 moves at a relatively fast pace, while approaching the destination and/or curve 410, the vantage point 406 slows.

Similarly, apparatus 20, such as processor 24, may cause the zoom level to vary so as to provide high level or zoomed-out perspective of the early stages of the destination preview animation, and a zoomed-in perspective when the vantage point 406 approaches the destination and/or curve 410.

Apparatus 20, such as the processor 24, may additionally or alternatively vary the height and/or angle of the vantage point so as to utilize three dimensional data provided by the geographic database. For example, the apparatus 20 may cause the vantage point to be lowered between tall buildings or mountain terrain, while gradually angling upward so as to maintain a view of a destination.

Moreover, based on any of the above factors impacting the animation perspective path, apparatus 20, such as processor 24, may additionally cause a base layer map, such as that provided by the geographic database, to change. For example, upon changing from route guidance mode to destination perspective mode, a base layer map provided to the user may change from a street map to a base layer map of imagery, to better assist the user in identifying their surroundings and comprehending an approach strategy provided by the navigation system, for example. In some embodiments, the base layer map may change at any point along the destination preview animation as determined by apparatus 20.

FIGS. 4B-4L provide example displays generated by apparatus 20 and provided via user interface 28. The displays represent snapshots or portions of a continuously provided destination preview animation.

Figure 4B:
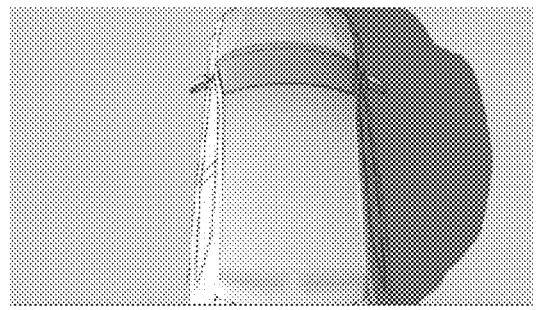

FIG. 4B provides an illustration of a vehicle overlaid on a map or other imagery, which is a part of an animation generated as apparatus 20 causes the vantage point to elevate and/or zoom out from the current position. In some examples, an initial portion of the animation may include a change in the vantage point as if a user is exiting the car and moving upward into a flyover position such that the top of the vehicle comes within view. The user may therefore maintain perspective with regard to the current location.

Figure 4C:
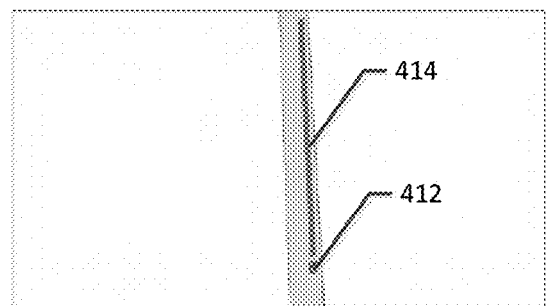
Figure 4D:
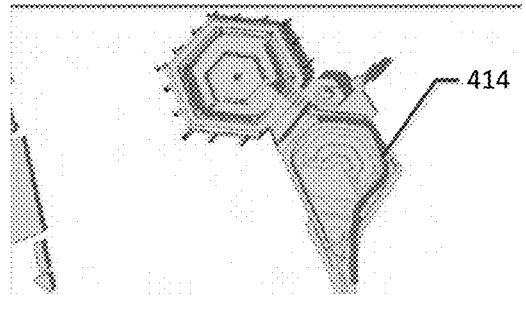
Figure 4E:
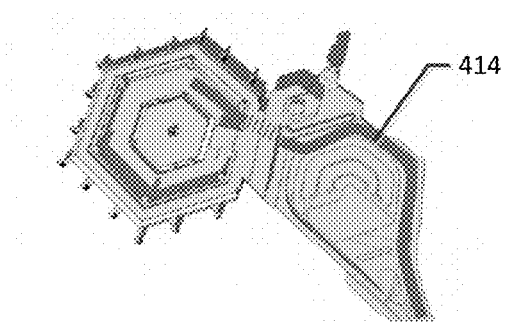

Apparatus 20 causes the vantage point to be elevated and/or zoomed further out, and FIG. 4C provides a view of the current position 412 along the route 414. The vantage point pans toward the destination, and the perceived movement slows as the destination is approached, as shown in FIG. 4D. FIG. 4E reflects a hovering (pause) and slight panning over the destination.

Figure 4F:
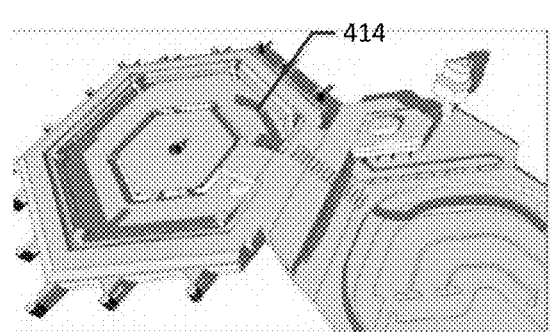
Figure 4G:
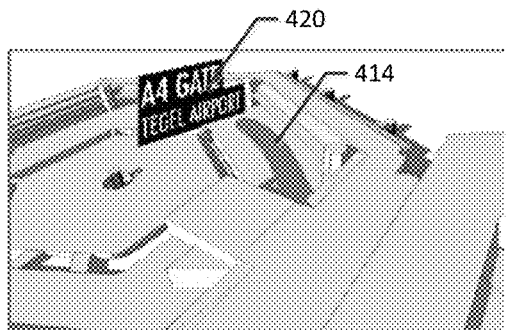
Figure 4H:
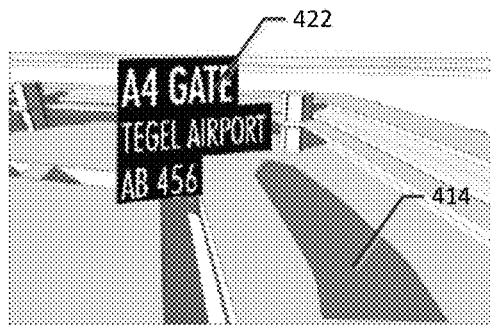
Figure 4I:
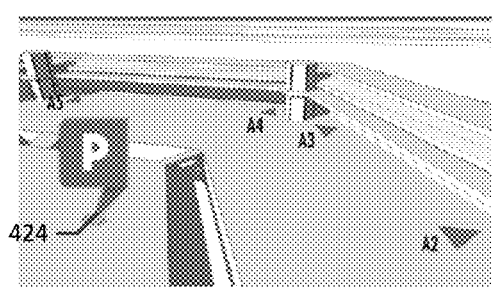

As shown in FIG. 4F, apparatus 20 causes the vantage point to be zoomed in closer to the destination. In FIG. 4G, the vantage point zooms even closer and the height of the vantage point lowers and angles upward to provide a perspective from a different angle. As the vantage point zooms in, details 420 are provided regarding the destination or surroundings on the map. In some examples, as details are added, the speed of the vantage point is slowed to allow the user to comprehend the details. In FIG. 4H, as the vantage point slowly pans over the destination and area surrounding the destination, additional or a more detailed level of information is provided by details 422. In FIG. 4I, further detail is illustrated as parking indicator 424 is provided, as well as individual gate markers A2, A3, A4, and A5.

Figure 4J:
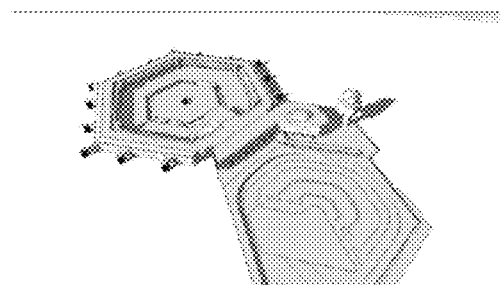
Figure 4K:
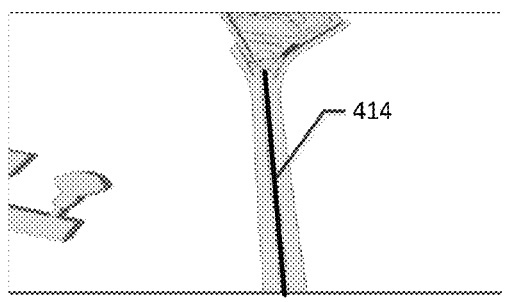
Figure 4L:
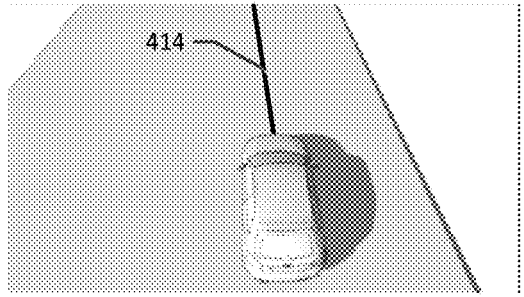

In some embodiments, once the apparatus 20 determines that sufficient detail of the destination has been provided to the user in the destination preview animation, the vantage point zooms out, as shown in FIG. 4J. The vantage point may pan back toward the current location, such as along the animation perspective path, or another similar path, as shown in FIG. 4K. As shown in FIG. 4L, the vantage point may return to the current location.

In some examples, upon completion of displaying a destination preview, or when the vantage point returns to the current location, a mode of the apparatus 20 may change back to route guidance. Additionally or alternatively, at any point during the destination preview, a user may make a selection to change the mode to route guidance mode. In this regard, an option may be provided on the user interface 28, to allow the user to select to switch between destination preview mode, and route guidance mode at any time. In instances where the user is not within a threshold distance or time of the destination, the user may still want to view the destination preview and may do so by user input. In some examples, a portion of user interface 28 may simultaneously provide a route guidance mode, and a portion may provide a destination preview mode.

FIGS. 5A-5D provide example displays generated by apparatus 20 and provided via user interface 28. The displays represent snapshots or portions of a continuously provided destination preview animation in which the destination is a transition point from one mode of transportation to another. The destination preview mode displays an end of a route associated with a first mode of transportation, and a beginning of another route associated with a second mode of transportation.

FIGS. 5A-5D include a route 500 and current location 502. FIGS. 5A and 5B include a first destination 504 that is a parking lot, and a second destination 506, such as a restaurant, to which the user may walk following parking of a car at the first destination 504. The example displays of FIGS. 5A and 5B may be provided during the route guidance mode. FIGS. 5C and 5D reflect displays provided following a change to the destination preview mode. The parking garage or lot associated with the first destination 504 is highlighted. The route 500 changes color following the first destination. In both FIGS. 5C and 5D, the destination preview mode provides an end of a route associated with a first mode of transportation (e.g., driving), and a beginning of another route associated with a second mode of transportation (e.g., walking). A route may include any number of modes of transportation including, but not limited to driving, walking, riding buses, trains, boats, other public transportation, and/or the like. A destination preview may be provided for each transition between modes of transportation.

FIG. 6 is yet another example display generated by apparatus 20 and provided by user interface 28. A user navigates toward an ultimate destination 600. A user selects indicator 602 to indicate the user would like to stop at a gas station, as an intermediary destination along a route 601. Area 604 of the display may be provided to reflect a route guidance mode or destination preview mode. A nearby gas station, or gas station along the route, is indicated by indicator 606 in area 604. The destination preview 610 provides imagery of the gas station, such that the destination is the gas station, or other POI along a planned route. However, in some instances, the imagery may only be available from one perspective, as it was captured from a vehicle which previously drove by in one direction and provided for storage in the geographic database. Especially in scenarios where navigation along the route 601 is from a different perspective from that of the available imagery, it may be beneficial for apparatus 20 to indicate the perspective, such as with indicators 1, 2, and 3 on both the destination preview 610 (the imagery), and the area 604. Because area 604 also indicates the route 601, the user can easily comprehend the perspective and spatial relationship of the imagery with respect to the route. The user may therefore easily identify the gas station while driving by utilizing the real life imagery and mapping or navigation guidance together.

The destination preview provided by apparatus 20 may therefore include any combination of the imagery and perspective indicators as provided in FIG. 6. In some examples, the apparatus 20 may even provide two different destination previews simultaneously, such as one including imagery, and the other including street maps and/or the like. It will be appreciated that any combination of data from the geographic database may be provided to the user to provide assistance to the user in locating a destination.

The destination previews provided by the apparatus 20 may significantly improve the usability of mapping or navigation applications for users. In particular, a destination preview animation may allow a user to view large amounts of data, such as from a geographic database, relating to a destination, while allowing the user to maintain perspective with a current location, a planned route, or other objects.

Furthermore, determining when to provide the destination preview, such as when a user approaches a destination, and/or an opportune time based on a detected movement of the apparatus 20, may ensure that the destination preview is provided at a convenient time for the user without distracting the user. A user may additionally or alternatively indicate to change from a route guidance mode to destination preview mode at any time. This may be particularly advantageous for a passenger riding along in a vehicle who can use the device without distracting a driver.

Moreover, the method, apparatus and computer program product provide numerous technical advantages including the conservation of processing resources and the associated power consumption otherwise expended to support various user input to control a portion of a map and/or a current route displayed by a navigation device. As an example a user may otherwise repeatedly exit a navigation application to preview a static map, and switch back to the navigation application for route guidance. Alternatively a user could swipe ahead on a touch screen display in an attempt to view a destination, while the application immediately returns to displaying the current location and route guidance. Example embodiments provide for more efficient processing through the provision of destination previews as described herein.

As described above, FIG. 2 illustrates a flowchart of operations of an apparatus 20, method and computer program product according to example embodiments of the invention. It will be understood that each block of the flowchart, and combinations of blocks in the flowchart, may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 26 of an apparatus employing an embodiment of the present invention and executed by a processor 24 of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included, some of which have been described above. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method for providing a destination preview, the method comprising:
    providing for display of route guidance information for a portion of a planned route including a current location to a destination in one of a plurality of modes of navigation assistance;
    calculating a current remaining travel time of a vehicle to the destination from the current location and comparing the current remaining travel time to a pre-defined threshold amount of time while providing for display of the route guidance information for the portion of the planned route;
    determining a current speed of the vehicle;
    in response to determining that the current remaining travel time is less than the pre-defined threshold amount of time, and that the current speed of the vehicle is below a pre-defined speed, causing the one of a plurality of modes of navigation assistance to be in a destination preview mode, wherein the destination preview mode animates a view of the destination from a moving overhead perspective vantage point without including the current location, wherein the moving overhead perspective vantage point follows a calculated animation perspective path from a point immediately following the current location along the planned route and continues to the destination while remaining on one side of a line of action determined based on the current location, the planned route, and the destination; and
    in response to determining that the current remaining travel time is greater than the pre-defined threshold amount of time, or that the current speed of the vehicle is above the pre-defined speed, causing the one of the plurality of modes of navigation assistance to be in a route guidance mode, wherein the route guidance mode does not include the destination.

2. The method of claim 1, wherein a change to the currently displayed one of the plurality of modes of navigation assistance comprises changing a type of base layer map.

3. The method of claim 1, wherein a change to the currently displayed one of the plurality of modes of navigation assistance comprises zooming out.

4. The method of claim 1, wherein calculating the animation perspective path comprises determining a height, zoom level, angle, and speed of the moving overhead perspective vantage point along the calculated animation perspective path.

5. The method of claim 1, wherein the destination is a transition point from one mode of transportation to another, and the destination preview mode provides display of an end of a first route associated with a first mode of transportation, and a beginning of a second route associated with a second mode of transportation.

6. The method of claim 1, wherein the destination is a point of interest along the planned route.

7. An apparatus comprising at least one processor and at least one non-transitory memory including computer program code, the at least one memory and the computer program code configured to, with the processor, cause the apparatus to at least:
    provide for display of route guidance information for a portion of a planned route including a current location to a destination in one of a plurality of modes of navigation assistance;
    calculate a current remaining travel time of a vehicle to the destination from the current location and comparing the current remaining travel time to a pre-defined threshold amount of time while providing for display of the route guidance information for the portion of the planned route;
    determine a current speed of the vehicle;
    in response to determining that the current remaining travel time is less than the pre-defined threshold amount of time, and that the current speed of the vehicle is below a pre-defined speed, cause the one of a plurality of modes of navigation assistance to be in a destination preview mode, wherein the destination preview mode animates a view of the destination from a moving overhead perspective vantage point without including the current location, wherein the moving overhead perspective vantage point follows a calculated animation perspective path from a point immediately following the current location along the planned route and continues to the destination while remaining on one side of a line of action determined based on the current location, the planned route, and the destination; and
    in response to determining that the current remaining travel time is greater than the pre-defined threshold amount of time, or that the current speed of the vehicle is above the pre-defined speed, cause the one of the plurality of modes of navigation assistance to be in a route guidance mode, wherein the route guidance mode does not include the destination.

8. The apparatus of claim 7, wherein a change to the currently displayed one of the plurality of modes of navigation assistance comprises a change of a type of base layer map.

9. The apparatus of claim 7, wherein a change to the currently displayed one of the plurality of modes of navigation assistance comprises a zoom out.

10. The apparatus of claim 7, wherein the calculation of the animation perspective path comprises a determination of a height, zoom level, angle, and speed of the moving overhead perspective vantage point along the calculated animation perspective path.

11. The apparatus of claim 7, wherein the destination is a transition point from one mode of transportation to another, and the destination preview mode provides display of an end of a first route associated with a first mode of transportation, and a beginning of a second route associated with a second mode of transportation.

12. The apparatus of claim 7, wherein the destination is a point of interest along the planned route.

13. A computer program product comprising at least one non-transitory computer-readable storage medium having computer-executable program code instructions stored therein, the computer-executable program code instructions comprising program code instructions for:

providing for display of route guidance information for a portion of a planned route including a current location to a destination in one of a plurality of modes of navigation assistance;

calculating a current remaining travel time of a vehicle to the destination from the current location and comparing the current remaining travel time to a pre-defined threshold amount of time while providing for display of the route guidance information for the portion of the planned route;

determining a current speed of the vehicle;

in response to determining that the current remaining travel time is less than the pre-defined threshold amount of time, and that the current speed of the vehicle is below a pre-defined speed, causing the one of a plurality of modes of navigation assistance to be in a destination preview mode, wherein the destination preview mode animates a view of the destination from a moving overhead perspective vantage point without including the current location, wherein the moving overhead perspective vantage point follows a calculated animation perspective path from a point immediately following the current location along the planned route and continues to the destination while remaining on one side of a line of action determined based on the current location, the planned route, and the destination; and in response to determining that the current remaining travel time is greater than the pre-defined threshold amount of time, or that the current speed of the vehicle is above the pre-defined speed, causing the one of the plurality of modes of navigation assistance to be in a route guidance mode, wherein the route guidance mode does not include the destination.

* * * * *